US006989213B2

(12) United States Patent
Kaiser et al.

(10) Patent No.: US 6,989,213 B2
(45) Date of Patent: Jan. 24, 2006

(54) METAL BIPOLAR PLATE

(75) Inventors: Wolfram Kaiser, Bonndorf (DE);
Detlev Repenning, Luebeck (DE);
Richard Spaeh, Ueberlingen (DE);
Joerg Wind, Immenstaad (DE)

(73) Assignee: Ballard Power Systems Inc., Burnaby (CA)

( * ) Notice: Subject to any disclaimer, the term of this patent is extended or adjusted under 35 U.S.C. 154(b) by 275 days.

(21) Appl. No.: 10/239,432

(22) PCT Filed: Apr. 6, 2001

(86) PCT No.: PCT/DE01/01352

§ 371 (c)(1),
(2), (4) Date: Nov. 13, 2002

(87) PCT Pub. No.: WO01/78175

PCT Pub. Date: Oct. 18, 2001

(65) Prior Publication Data

US 2004/0038108 A1   Feb. 26, 2004

(30) Foreign Application Priority Data

Apr. 6, 2000   (DE) .............................. 100 17 200

(51) Int. Cl.
*H01M 8/02* (2006.01)
*B32B 15/00* (2006.01)
(52) U.S. Cl. .......................... 429/34; 429/38; 428/627; 428/632
(58) Field of Classification Search ................ 429/34, 429/35, 36, 37, 38, 39; 428/627, 632, 633
See application file for complete search history.

(56) References Cited

U.S. PATENT DOCUMENTS 4,753,854 A * 6/1988 Gavrilov et al. ........ 428/627 X
5,733,682 A * 3/1998 Quadakkers et al. ...... 429/34 X
6,322,919 B1 * 11/2001 Yang et al. .................... 429/34

FOREIGN PATENT DOCUMENTS

| DE | 195 23 637 A1 | 7/1996 |
| DE | 195 34 047 C1 | 12/1996 |
| DE | 198 05 683 A1 | 8/1999 |
| EP | 0 780 916 A1 | 6/1997 |
| EP | 867525 | * 9/1998 |
| EP | 0955686 | 11/1999 |
| JP | 61051770 | 3/1986 |
| JP | 63-138663 | 10/1988 |
| JP | 11219713 | 8/1999 |
| JP | 2000353531 | 12/2000 |
| WO | 99/32678 | * 7/1999 |

OTHER PUBLICATIONS

English translation of JP 2000-353,531 form the Japanese Patent Office Website (document dated Dec. 2000).*

* cited by examiner

*Primary Examiner*—Stephen J. Kalafut
(74) *Attorney, Agent, or Firm*—Seed IP Law Group PLLC

(57) ABSTRACT

The invention relates to a metal bipolar plate for a fuel cell, provided with a low-ohmic chemically stable coating. According to the invention, said coating is a multi-phase coating, at least in the region of the contacting outer surface thereof. One phase is a metal phase and/or α phase belonging thereto and another phase is a compound phase consisting of one or several metals of the metal phase and one of the elements N,O,C,B.

12 Claims, 1 Drawing Sheet

METAL BIPOLAR PLATE

BACKGROUND OF THE INVENTION

The present invention relates to a metal bipolar plate for fuel cells, in particular, for fuel cells of the types PEMFC (Polymer Electrolyte Fuel Cell) and DMFC (Direct Methanol Fuel Cell).

PEMFC and DMFC cells have the task of converting chemical energy carriers such as hydrogen (in the case of a PEMFC) or alcohols such as methanol (in the case of a DMFC) into electric energy. The reaction with hydrogen produces water; the reactions with methanol produce, besides water, such products as carbon dioxide, formic acid, formaldehyde, and other products. If, instead of pure hydrogen, reformate gas is used in the electrochemical conversion, it must be considered that carbon monoxide is also contained in the gas. Moreover, it is to be assumed that sulfate ions and fluorine ions or fluorine are released in the interaction with the perfluorinated and sulfonated electrolyte membrane. Overall therefore, a corrosive mixture at a pH between 1.5 and 5 is present in the cells, which not only causes the degradation of the catalytically acting electrode but is also able to attack the bipolar plates. For this reason, at present, bipolar plates made of carbon are predominantly used. Plates made of resin bonded carbon are also discussed as variants. Carbon plates not only have disadvantages in terms of cost but also with regard to mass production and to their susceptibility to brittleness.

For reasons of production and cost, metal plates have fundamental advantages. However, especially when using austenitic high-grade steels, their disadvantages are the high surface resistances and their susceptibility to corrosion. Other materials, such as copper- or aluminum-based alloys are even more problematic, particularly with regard to corrodibility.

In order to eliminate the mentioned disadvantages of metal bipolar plates, it is possible to apply a coating thereto. Noble metal coatings of gold, platinum, palladium, or other are efficient in this context. Using coatings of this kind, the surface resistances are below 5 $m\Omega/cm^2$ whereas carbon plates have resistances on the order of about 15 $m\Omega/cm^2$, i.e., much higher resistances.

However, for reasons of cost alone, noble metal coatings have to be ruled out. In fact, a platinum layer having a thickness of only 1 micrometer over a surface of 1 $m^2$ weighs about 20 g. It is, of course, also possible to conceive of solutions with markedly thinner layers. During the long-term use of the fuel cells, however, pitting corrosions are very probable with the noble metals on less noble substrates, resulting in an increased release of nickel ions. Nickel ions damage, in particular, the polymer electrolyte and cause increased degradation of the cell.

Often, instead, coatings on the basis of hard materials are proposed, such as titanium nitride or titanium carbide, chromium nitride or other ternary compounds, composed of the refractory metals with nitrogen, boron, and carbon. All of these variants do not fulfill the requirements with regard to low-value surface resistances. Surface resistances above 20 $m\Omega/cm^2$ reduce the efficiency of the fuel cells at high-current loads by approximately 5%.

SUMMARY OF THE INVENTION

An object of the present invention is to devise a coating for a metal bipolar plate which makes it possible to achieve a reliable corrosion protection combined with low surface resistances.

According to the present invention, the metal bipolar plate features a coating which contains multiple phases at least in the region of its contacting external surface. In this context, one of the phases is a metallic phase and/or the $\alpha$-phase thereof. A further phase is constituted by the chemical compound of one or more metals of the metallic phase and one of the elements N,O,C,B (hereinafter referred to as compound phase).

In this context, the side at which contact takes place to the neighboring component within the fuel cell stack, i.e. typically to a diffusion layer of a carbon material, is referred to as an external surface.

The $\alpha$-phase of a metal is the state in which nitrogen, oxygen, carbon or boron is dissolved interstitial (according to the phase diagram).

According to the language used in the technical literature of chemistry, N,O,C,B will hereinafter also be referred to as metalloids.

The metallic phase is preferably composed of one of the elements Cr, Ti, Mo, W, V or Fe.

In particular, chromium nitride, which is preferably formed as $Cr_2N$ compound, and chromium carbide are used as compound phase (hereinafter also be referred to as hard material phase).

The coating according to the present invention is chemically stable and offers reliable corrosion protection, while at the same time involving low surface resistances. The inventive coating also fulfills the requirement of not releasing unwanted ions such as nickel, chromium, lead or iron itself due to corrosion and is inexpensive to manufacture.

Moreover, it is an advantage that the proportion of the compound phase increases in an inward direction, i.e., in the direction of the substrate surface. In particular, the region of the coating on the side of the substrate can be exclusively composed of the compound phase.

The concept according to the present invention is based on three fundamental electrochemical and material engineering principles, namely 1. that the external layers are less noble than the layer lying immediately below and than the substrate material, and
2. that they are chemically stable in hot, diluted sulfuric acid in the presence of fluorine ions, and
3. the metallic phase provides that the surface resistances remain low.

In principle, pure metal layers, for example, of Cr are, of course, conceivable as well, but firstly, these do not have sufficient chemical stability and, secondly, they have higher surface resistances than the inventive mixed phases due to the passivation.

In a particularly advantageous embodiment, the metal phase is produced from an alloy of at least two metals to further stabilize the metal phase. These metals are then contained in the compound phase together with a metalloid. In these, for example, ternary compounds, the compositions result from the rules of phase equilibriums according to the phase diagrams for three-material systems. Phases containing titanium or molybdenum as metals in addition to chromium, have turned out to be particularly advantageous. The production of these multicomponent mixed phases directly at the surface, permits the chemical and electrochemical "fine-tuning" at the surface. The resistance to fluorine ions is increased in the mixed phase, in particular, by molybdenum.

In all cases, the tests show that it is not only possible to adjust the electrochemical mixed potentials at the surface in a controlled manner but also the tendency to form oxides.

A further advantage of the coating according to the present invention is to be seen in that they provide effective corrosion protection even in the case of very thin layer thicknesses. Therefore, the layer thicknesses can be in the submicron range up to several micrometers, in particular, 0.1 micrometer to 10 micrometers and, within that, advantageously between 0.3 micrometer to 1 micrometer.

FIG. 1 shows the concentration depth profile of an embodiment of the coating according to the present invention, here of a chromium-based coating. The depth values (given as sputtering time in sec. for depositing the layer) are indicated along the abscissa in relation to the external surface of the coating, that is, the region at the external surface of the coating is situated on the left. The concentrations of the involved elements are indicated on the ordinate (the Fe concentration shown originates from the substrate material, the bipolar plate). In the depth profile, the pure $Cr_2N$ phase is discernible with a nitrogen concentration of 33 atom %. At the surface, the proportion of this phase is approximately 10% in the mixed phase. The measured surface resistance of such a sample lies at 12–14 $m\Omega/cm^2$. Thus, the surface resistances are lower than that of carbon. The chemical stability of such layers is extraordinary. It is not attacked by 0.1n $H_2SO_4$ even after months. No Cr ions can be detected in the solution by atomic absorption spectrometry. In this context, the cyclic voltammetric analyses are informative as well. Normally, clear passivation peaks are recorded, for example, on high-grade steel or on chromium; the passivations turn out to be much less strong on the mixed phases according to the present invention. This explains the low surface resistance of the layers. Table 1 specifies the dependence of the surface resistances on the layer compositions. Those of the chromium nitride layers and of carbon and gold are also shown for comparison. Chromium nitride has a resistance which is more than 10 times higher than that of the mixed phases according to the present invention. The pure $Cr_2N$ phase also lies above the inevitably resistances.

DETAILED DESCRIPTION

Figure 1:
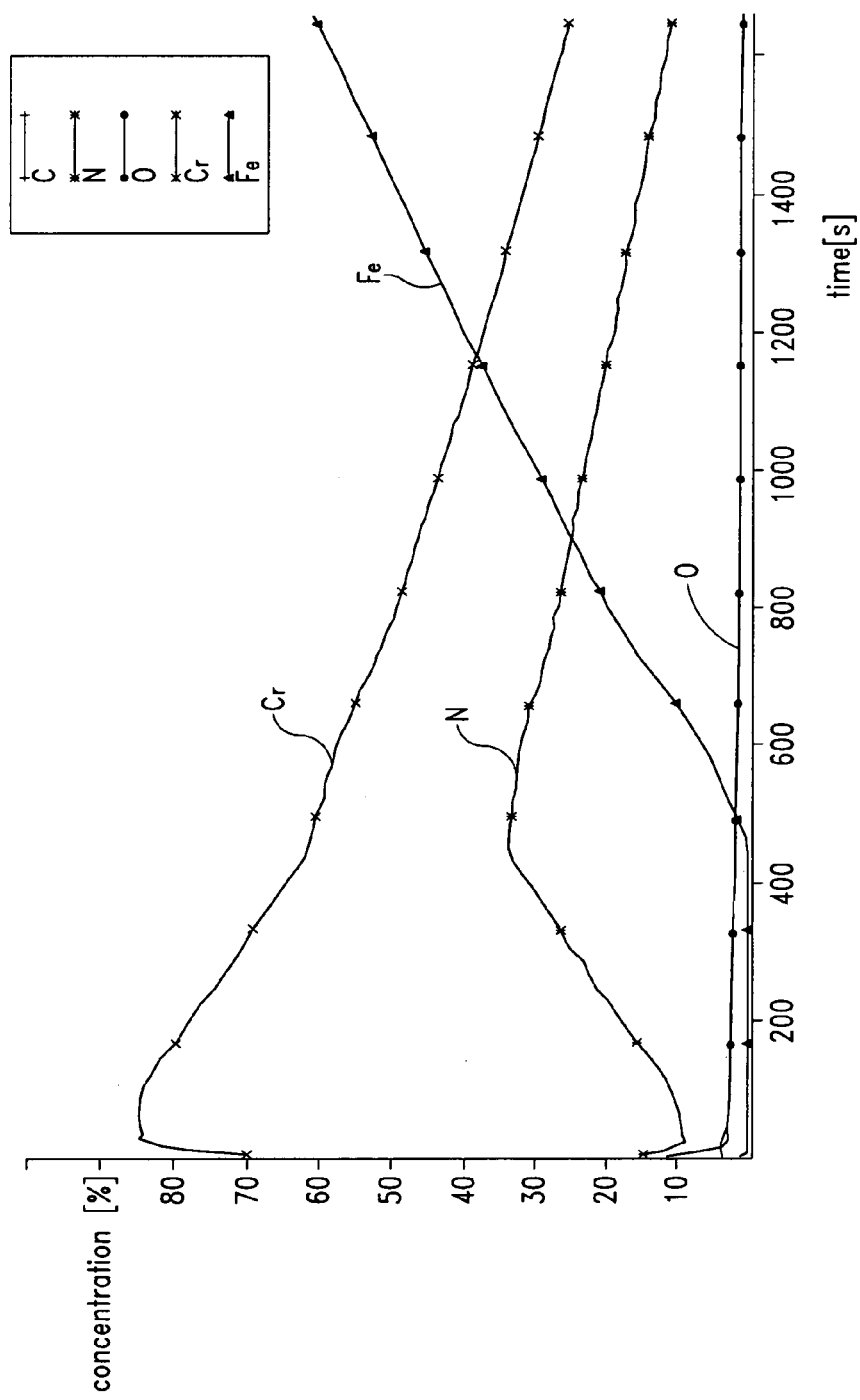
FIG. 1 shows a concentration depth of a chromium-based coating according to the present invention plotted against the sputtering time in seconds for depositing the layer.

Also specified in Table 1 is the also inventive multiphase solid mixture of Cr—Ti having a content of 15 atom % of a $(Cr,Ti)_2N$ phase. The mixed phase is nobler than the corresponding pure chromium-containing mixed phase but still less noble than the substrate material which is an austenitic high-grade steel. The surface resistances of this mixed phase lie at 14–16 $m\Omega/cm^2$. The cyclic voltammetry shows slightly pronounced peaks toward higher values. They lie at approximately 1.1 V vs. SCE in 0.1N $H_2SO_4$.

Also contained in Table 1 is the multiphase solid mixture of a metallic phase of Cr—Mo having a content of 20 atom % of compound phase $(Cr,Mo)_2N$.

TABLE 1

| Layer | Surface resistance, measured with carbon diffusion layer R ($m\Omega/cm^2$) | Nitrogen content atom % | residual "gases" |
|---|---|---|---|
| CrN | >60 | approx. 50 | C, O, B |
| $Cr_2N$ | >40 | 33.3 | C, O, B |
| Cr with 40% $Cr_2N$ | 16–19 | 13 | C, O, B |
| Cr with 20% $Cr_2N$ | 14–16 | 6.6 | C, O, B |
| Cr with 10% $Cr_2N$ | 12–14 | 3.3 | C, O, B |
| Cr with 20% $Cr_2N$ +50 nm Pt | 5–7 | 6.6 | C, O, B |
| CrTi with 15% $(Cr,Ti)_2N$ | 14–16 | | C, O, B |
| CrMo with 20% $(Cr,Mo)_2N$ | 13–15 | | C, O, B |
| carbon | 15 | | |
| gold | 5 | | |

The table shows a further exceptional feature of the inventive solution, namely, that a platinum layer having a thickness of only 50 nm is sufficient as a final layer to calibrate the resistance to the order of magnitude of gold surfaces. The measured variance in resistance results from the roughness effects of the surface. These were adjusted to average roughness values of Ra=0.15 to Ra=0.25 for reasonable comparability.

A good measure for the quality of the low-resistance surface can also be seen in the relative independence of the pressure of the carbon diffusion layer acting against the surface. Here, really large dependencies are found, in particular, for the layers having a very high resistance.

What is claimed is:

1. A fuel cell comprising:
   a metal bipolar plate; and
   a layer coating the plate, the layer having a contacting external surface and having a plurality of phases at least in a region of the contacting external surface, a first phase being a metallic phase and/or an associated α-phase of the metallic phase, and second phase being a compound phase including one or more metals of the metallic phase and one of the elements N, O, C and B, wherein the layer has a surface resistance lower than about 20 $m\Omega/cm^2$.

2. The fuel cell of claim 1 wherein the metallic phase is composed of Cr, Ti, Mo, W, V, Fe, or an alloy thereof.

3. The fuel cell of claim 1 wherein the metallic phase is composed of Cr or of the α-phase of Cr.

4. The fuel cell of claim 3 wherein the compound phase is composed of $Cr_2N$ and/or $Cr_7C_3$.

5. The fuel cell of claim 1 wherein the metallic phase is composed of an alloy of Cr—Ti or Cr—Mo.

6. The fuel cell of claim 5 wherein the compound phase is composed of a ternary compound $(Cr,Mo)_2N$ or $(Cr,Ti)_2N$.

7. The fuel cell of claim 1 wherein a composition of a heterogeneous mixed phase including the first and second phases has a content of nitrogen, carbon, oxygen or boron between x=4 atom % and x=45 atom %.

8. The fuel cell of claim 1 wherein a concentration of the compound phase decreases toward the external surface.

9. The fuel cell of claim 1 wherein in a region of the layer on a side of the plate, only the metallic phase is present.

10. The fuel cell of claim 1 further comprising a Pt film on the external surface of the layer.

11. The fuel cell of claim 10 wherein the Pt film has a thickness of less than 100 nm.

12. The fuel cell of claim 11 wherein the thickness of the Pt film is less than or equal to 50 nm.

* * * * *